Jan. 16, 1968  W. L. HOERRNER  3,363,277
ROTARY WINDSHIELD WIPER ASSEMBLY
Filed Feb. 25, 1965  2 Sheets-Sheet 2
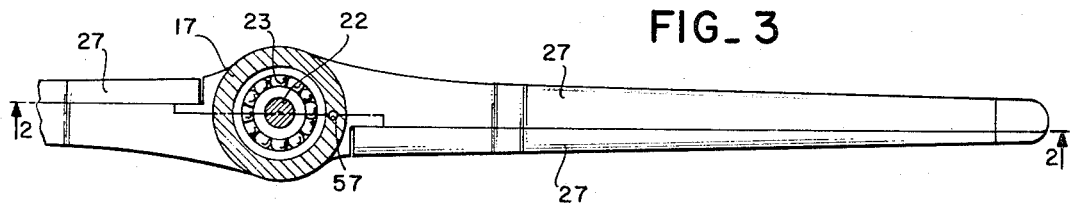
FIG_3
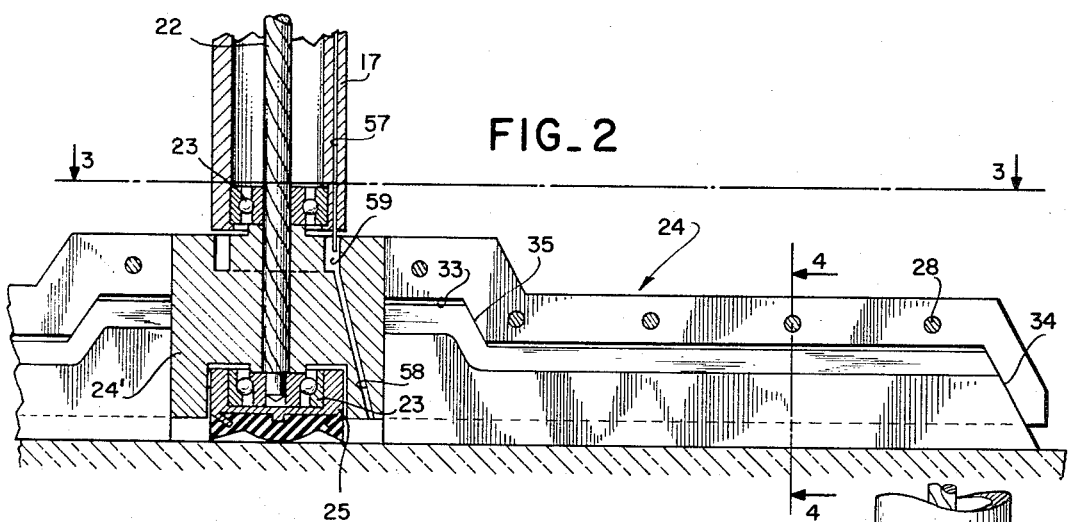
FIG_2
FIG_4
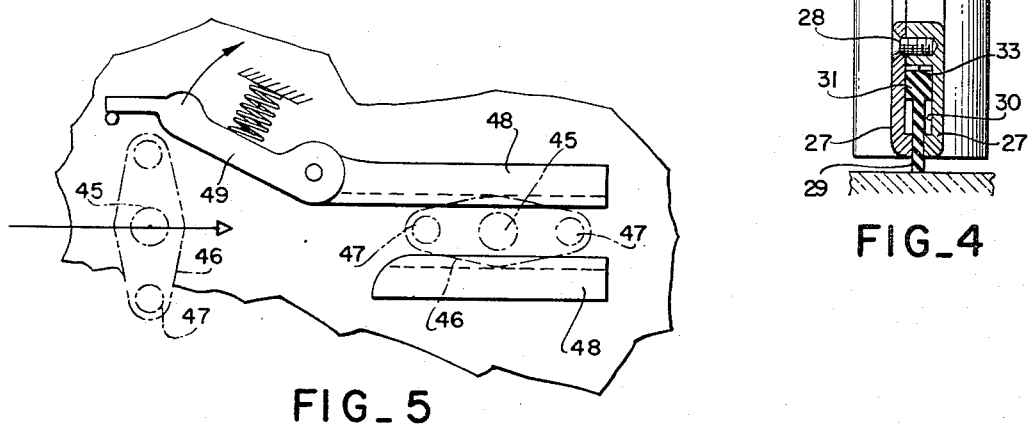
FIG_5
INVENTOR.
WILLIAM L. HOERRNER
BY
George C. Sullivan
Agent

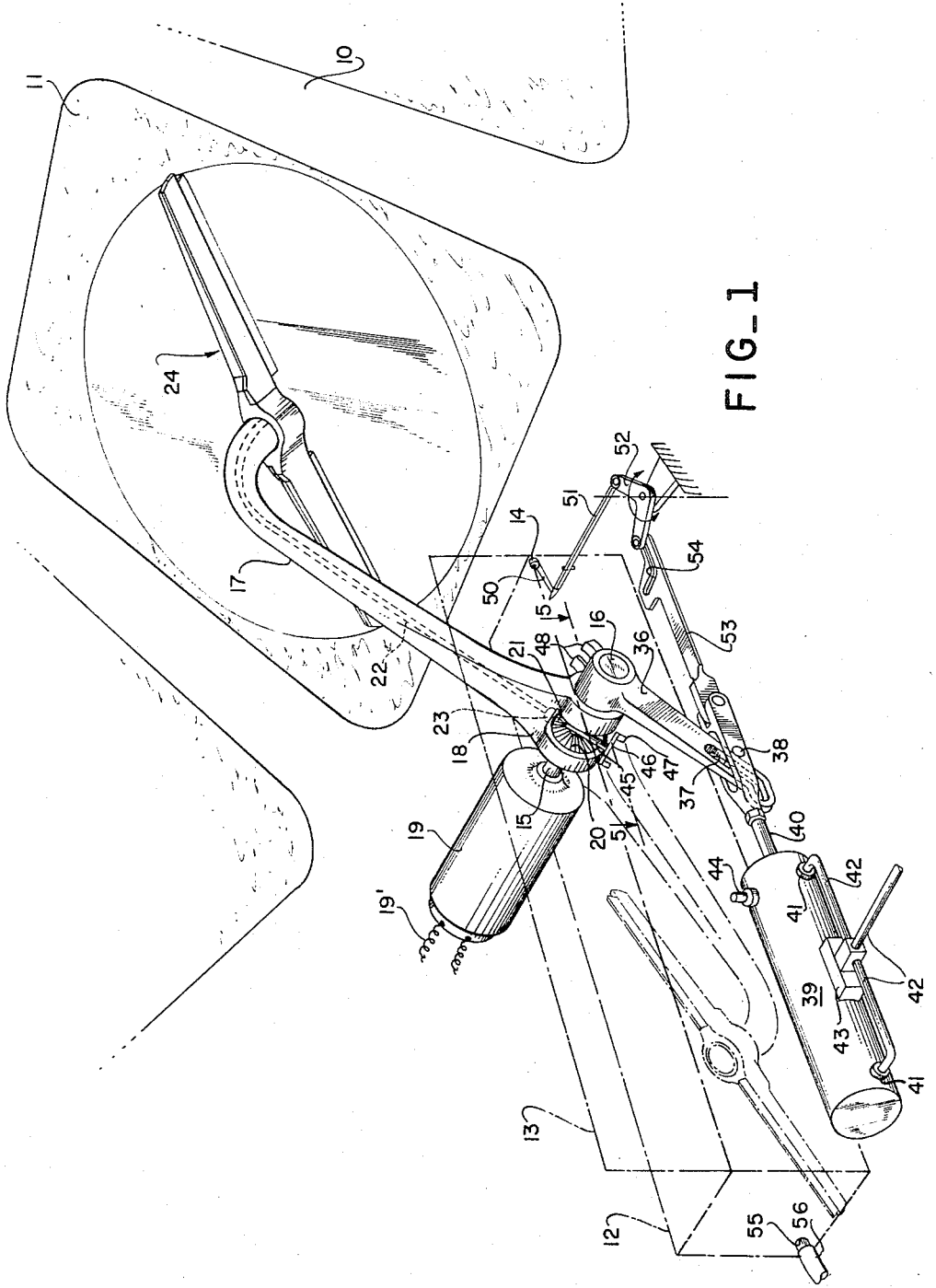
FIG_1

3,363,277
ROTARY WINDSHIELD WIPER ASSEMBLY
William L. Hoerrner, Marietta, Ga., assignor to Lockheed Aircraft Corporation, Burbank, Calif.
Filed Feb. 25, 1965, Ser. No. 435,147
4 Claims. (Cl. 15—250.19)

This invention relates to windshield wipers and more particularly to a rotary windshield wiper assembly that is especially adapted for high performance aircraft, i.e., aircraft designed for normal flight speeds in excess of 300 miles per hour.

Rotary windshield wipers have been generally recognized as superior to the more conventional oscillating wipers not only because of their higher operating speeds for faster removal of snow, rain, etc., but also because their unidirectional operation permits a constant speed as well as compensating air loads acting on opposite sides thereof when used in diametrically opposed pairs. Moreover, as opposed to oscillating blades, the rotary blade can be installed in such a manner that it is less distracting and annoying to the operator of a vehicle since at its considerably higher speed it virtually disappears from his vision.

Attempts heretofore made to capitalize on the above and other advantages of rotary wipers have met with many difficulties, particularly in their application to high performance aircraft. Thus, during normal or level flight of such aircraft, these rotary wipers impose objectionable drag penalties. Because of their greater operational speed, they create "liftoff" problems, i.e., a tendency of the rotary wiper to move out of contact with the windshield surface. Also because of their greater speed, rotary wipers are subject to excessive wear requiring frequent replacement and the possibility of periods of ineffective operation.

It is therefore a principal object of the present invention to provide a practical rotary wiper mechanism that is especially adapted for windshields of present day high performance aircraft. To this end, the instant invention contemplates a rotary wiper that is, during operation, firmly supported against displacement by severe and variable air loads, capable of positive constant contact with the associated windshield surface without excessive friction, and movable between its operating position externally of the aircraft and a stowed position totally inside of the aircraft.

More specifically, the rotary wiper herein proposed is mounted on a rigid support secured to stationary structure of the vehicle and movable to and from an operating position with its blade or blades in contact with the windshield and a stowed position with the entire wiper assembly retracted and enclosed within the vehicle. Relatively uncomplicated but completely reliable means is provided to facilitate this movement by automatically and sequentially locating components of the assembly in a predetermined position.

Additionally, the construction and mounting of the wiping element is such as to ensure continuous, yieldable contact thereof with the windshield during its operation. At the same time, means is provided for the adjustment of the pressure of this contact whereby a range of windshield designs and operating conditions may be accommodated.

With the above and other objects in view as will be apparent, this invention consists in the construction, combination and arrangement of parts all as hereinafter more fully described, claimed and illustrated in the accompanying drawings wherein:

FIGURE 1 is an isometric view of a rotary wiper assembly in accordance with the teachings of this invention illustrated in its operating position with the wiper element in contact with an associated windshield of a vehicle to show the components thereof by which it is moved to and from the retracted or stowed position illustrated in phantom lines;

FIGURE 2 is a longitudinal section through the outer end portion of the support and a fragment of the wiper element as well as the associated portion of the windshield to show the mounting of such element on its support as well as the construction and mounting of the blade therein;

FIGURE 3 is a section along line 3—3 of FIGURE 2;

FIGURE 4 is a section along line 4—4 of FIGURE 2; and

FIGURE 5 is a plan view of positioning means by which the wiper elements are automatically located in a predetermined position for stowage within the vehicle during the retraction operation, the coacting component of the wiper element being shown in phantom lines.

Reference being had more particularly to the drawings, 10 designates a portion of a vehicle having a windshield 11. Adjacent the windshield 11 in the body of the vehicle 10 is a generally rectangular slot underlying which is a compartment 12 secured to internal structure of the vehicle 10 in any conventional manner. The upper edge of the compartment 12 is disposed in a plane adjacent that of the outer surface of the vehicle 10 and is provided with a door 13 hinged along one longitudinal edge thereof as at 14 whereby it is free to swing to and from positions opening and closing the compartment 12. When disposed in its closed position, the door 13 forms a smooth and uninterrupted continuation of the external surface or skin of the vehicle 10.

A pair of axially aligned shafts 15 and 16 pierce the longitudinal sidewalls, respectively, of the compartment 12 being freely rotatable therein and terminate in spaced ends within the compartment 12. A rigid, tubular post 17 is mounted on the associated ends of the shafts 15 and 16 to project perpendicularly therefrom, the end of the post 17 being bifurcated as at 18 to permit its fixed connection, for example through spline means or the like, to the shaft 16 and its freely rotatable connection through appropriate bearing means to the shaft 15.

At its other end outside the compartment 12, the shaft 15 is operatively connected to a conventional motor 19 by which it is rotated in the desired manner. Through conventional means such as conductors 19' in the case of an electric motor 19, the rotation of the shaft 15 is controlled from a convenient location within the vehicle 10. Within the compartment 12 the shaft 15 terminates in a drive gear 20 disposed in the space defined by the bifurcation 18 where it meshes with a driven gear 21. This driven gear 21 is carried by and at one end of a flexible drive shaft 22 that passes through the post 17, being mounted therein adjacent opposite ends for unrestricted rotation in bearings 23 following conventional practice.

Adjacent its outer end, the shaft 22 projects beyond the extremity of the post 17 where it is adapted to mount a wiper element 24. To this end, the wiper element 24 is formed with a central mount or hub 24' in which the shaft 22 is connected or keyed to project at right angles therefrom. The element 24 is retained on the shaft 22 in a position against lineal movement between the extremity of the post 17 and a retaining lug 25 on the extremity of the shaft 22. This lug 25 is a cup-like member adapted to overlie and enclose the bearing 23 in which the associated end of the shaft 22 is mounted. Thus disposed the lug 25 is engaged and secured as by press fit or the like to the outer periphery of the bearing 23 and seats within a recess provided therefor in the hub 24' of the wiper element 24. The outer portion of the lug 25 is fabricated of resilient material, preferably a synthetic resin, and adapted to extend beyond the surface of the hub 24' and abut the windshield 11 when the wiper element is in its operative position.

The wiper element 24 comprises a pair of diametrically opposed vanes 26 extending from the hub 24'. Each vane 26 is formed by a pair of longitudinal plates 27 removably secured one to the other adjacent one of their longitudinal sides by fastening means 28. Adjacent their other longitudinal sides, the plates 27 clampingly secure a wiper blade 29 which projects outwardly therefrom for contact with the windshield 11 when the assembly is in its operative position. A longitudinal slot 30 is thereby produced in each vane 26 medially of its width and a longitudinal bead 31 along the inner edge of the respective blades 29 slidably engages the surfaces of the plates 27 defining each slot 30 whereby the blades 29 are allowed limited lateral movement with respect to the vane 26.

Each vane 26 is formed with a longitudinal shoulder 33 extending from the hub 24' outwardly that forms the base of the slot 30. This shoulder 33 is generally perpendicular to the shaft 22 and terminates in an angularly disposed portion 34 adjacent the outer end of each vane 26. Adjacent the hub 24' each shoulder 33 has an angularly disposed offset or jog 35 parallel to the portion 34 of the same vane 26 whereby the associated blade 29 formed at and along its inner edge with surfaces corresponding to the shoulder 33 is slidably mounted within its vane 26 for movement outwardly thereof and of the hub 24' in its slot 30 by centrifugal force upon rotation of the wiper element 24.

While in its preferred embodiment as shown the wiper element 24 comprises a pair of vanes 26 as above described to accommodate a pair of wiper blades 29 symmetrically disposed about the shaft 22, it is to be understood that any number of such vanes may be employed each with an associated blade. It is conventional practice in certain applications to employ a single wiper blade in which case an asymmetrical vane is associated therewith appropriately counterbalanced by weight means provided on the wiper element on the opposite side of the drive shaft 22.

In order to move the post 17 to and from the operative position with the wiper element 24 adjacent the windshield 11, suitable actuating linkage is connected thereto through the shaft 16. To this end, the shaft 16 externally of the compartment 12 is secured to an angularly disposed lever 36. At its outer end this lever 36 is pierced by a slot 37 for its pivotal connection as at 38 to a power actuator, such as a pneumatic cylinder 39. The cylinder 39 is of conventional design including an internal piston with a rod 40 projecting therefrom for engagement with the lever 36 through the pivotal connector 38. Suitable fluid ports 41 are provided in the ends of the cylinder 39 on opposite sides of the piston therein for the connection of feed/return lines 42 from a remote pressurized fluid source. A control valve 43 actuated by conventional means from the interior of the vehicle 10 is operatively connected in the lines 42 to direct the flow of fluid to either side of the piston whereby the rod 40 thereof is extended and contracted accordingly. The cylinder 39 further includes an adjustable bleed port 44 of conventional design to control the pressure developed thereby.

In view of the foregoing, operation of the cylinder 39 rotates the lever 36 to swing the post 17 and the wiper element 24 carried thereby to and from the operative position adjacent the windshield 11 and the inoperative or stowed position internally of the aircraft 10 in compartment 12. In order to ensure the proper prepositioning of the element 24 during its retraction for reception by the compartment 12, the motor 19 may incorporate automatic radial positioning means for the shaft 15. These motors are well known to the art having been heretofore used and such motor per se forms no part of the present invention.

In its preferred form, however, the invention includes its own relatively uncomplicated prepositioning means for the element 24 during retraction of the post 17 which may be employed alone or supplemental to the above-mentioned prior art motor. Accordingly, the inner end of the shaft 22 on which the driven gear 21 is carried is provided with a coaxial extension 45 at the outer end of which a plate 46 is fixedly mounted to project laterally and concentrically therefrom. Adjacent each of its outer ends, the plate 46 carries a projecting pin 47 extending from the face thereof in opposition to the extension 45.

On the bottom wall of the compartment 12, guide means is mounted for coaction with the plate 46 for the rotation thereof to a predetermined position disposing the wiper element 24 parallel to the post 17. To this end, such guide means is formed by a pair of spaced rails 48 one of which has a forward angularly disposed extension 49 to receive in abutting contact one or the other of the pins 47 during movement of the support 17 toward the compartment 12. This extension 49 is spring loaded in the direction of the rails 48 with a fixed stop limiting the operation of such spring to normally dispose the extension in a predetermined position.

Thus, the pins 47 are assured of a position in fore and aft alignment in, for passing into, the space defined by the rails 48, such space having a width substantially equal to that of the plate 46. The wiper element 24 carried at the outer end of the post 17 is thereby automatically rotated by the operation of the pins 47 between the guide rails 48 to seat within the compartment 12.

The door 13 of the compartment 12 is opened and closed in concert with the protraction and retraction of the wiper assembly through a linkage train connecting the actuator 39 to the door 13. More specifically, the hinge 14 of the door 13 is formed with an outwardly projecting arm 50 pivotally connected at its outer end to a link 51 which in turn is pivotally connected at its outer end to a bellcrank lever 52. The bellcrank lever 52 is appropriately mounted to associated fixed structure of the vehicle and serves to connect the link 51 to the piston rod 40 through a link 53.

The link 53 is provided with an angular slot 54 through which the bellcrank 52 is connected to permit a predetermined lost motion upon actuation of the piston rod 40 so that the rotation of the post 17 is synchronized with the opening and closing of the door 13. The slot 37 in the lever 36 corresponds in size and shape to the slot 54 whereby the proper sequence is obtained in both directions, i.e., movement of the wiper assembly to and from its operative and inoperative positions.

Adjacent the bottom of the compartment 12, one or more drain fittings 55 are provided each to receive and connect a conduit or hose 56 whereby water collecting therein may be removed. By properly angling or pitching the compartment 12, virtually all the water entering the compartment may thereby be conveyed from the compartment 12 for ultimate disposal from the vehicle.

In the light of the foregoing construction and arrangement, it should be apparent that the several advantages of the rotary wiper are obtainable without the attendant disadvantages of such prior devices. The disposition and retention of the wiper assembly in its operative position is ensured through the power cylinder 39 and its positive connection to the wiping element 24 whereby the liftoff problem is eliminated. In short, the blade or blades 29 are maintained in constant contact with the windshield 11. The retaining force applied by the cylinder 39 is supplemented by the centrifugal force of the element 24 in combination with the angularly disposed portions 34 and 35 of each shoulder 33 and corresponding portions of the associated blade 29. This is irrespective of the condition of the blade 29 due to its normal wear. At the same time freedom of each blade 29 to reciprocate in its slot 30 eliminates excessive wear of such blade 29 usually caused by high speed rotation.

This structure further lends itself to the incorporation therein if desired of water repellent fluid ducting in an effective manner. Thus, the post 17 may be bored to accommodate a tube 57 connectable at one of its ends within the vehicle to a fluid source and terminating at its other end in communication with duct means 58 provided in the hub 24'. To this end an annular groove 59 is provided in the face of the hub 24' adjacent the end of the post 17. One or more ducts 58 extend from the base of the groove 59 to the outer face of the hub 24' opening onto the surface of the windshield 11.

Each of the ducts 58 is angularly disposed with respect to the shaft 22 sloping radially outward from the groove 59 to the outer face of the hub 24'. This effects a negative pressure condition during rotation of the element 24 to facilitate the flow of fluid from the groove 59 for ultimate discharge onto as well as to distribute the fluid over a wider area of the windshield 11. The rotating blades 29 serve to further distribute the fluid after it contacts the windshield 11.

While a particular embodiment of the invention has been hereinabove illustrated and described, it should be understood that various changes and modifications may be made without departing from the spirit and scope of the invention as set forth in the appended claims.

What is claimed is:

1. A rotary wiper assembly for a windshield of a vehicle comprising a rigid post pivotally mounted internally of said vehicle adjacent said windshield, a wiper element rotatably mounted at the outer extremity of said post, said wiper element including at least one rigid vane with a wiper blade mounted for limited, substantially unrestricted sliding movement therein, each said vane and wiper blade being provided with complemental angularly disposed shoulders sloping radially outward relative to said post whereby each blade is forced outwardly of the wiper element during the rotation thereof and a two-way actuator mounted within said vehicle and connected to said post for the movement thereof about its pivot to and from extreme positions totally within the vehicle and projecting outwardly therefrom with its wiper element in contact with said windshield.

2. A rotary wiper assembly for a windshield of a vehicle comprising a rigid post pivotally mounted internally of said vehicle adjacent said windshield, a wiper element rotatably mounted at the outer extremity of said post, a two-way actuator mounted within said vehicle and connected to said post for the movement thereof about its pivot to and from extreme positions totally within the vehicle and projecting outwardly therefrom with its wiper element in contact with said windshield, a drive shaft mounted internally of said post and connected at its outer end to said wiper element, a motor mounted within said vehicle, a gear connection between said motor and said drive shaft, and prepositioning means for said wiper element interposed between said shaft and said vehicle whereby said wiper element is located in a predetermined position with reference to said post upon movement thereof into said vehicle.

3. The assembly of claim 2 wherein said prepositioning means includes diametrically opposed extensions concentrically positioned on and projecting from said shaft, and a pair of rails carried by said vehicle, said rails including a flared forward surface for contact with at least one of said pins and defining a space having a transverse dimension substantially equal to that of each of said extensions.

4. The assembly of claim 3 wherein said flared forward surface is hinged to one of said rails and including resilient means operative thereon to normally maintain it in a preselected position.

References Cited

UNITED STATES PATENTS

| 2,246,740 | 6/1941 | Lethbridge | 15—250.19 |
| 2,268,253 | 12/1941 | Hill et al. | 15—250.19 X |
| 2,607,066 | 8/1952 | Morton | 15—250.22 |
| 2,895,157 | 7/1959 | Kocourek | 15—250.19 |
| 3,050,765 | 8/1962 | Eichler | 15—250.19 X |
| 3,225,376 | 12/1965 | Heiler | 15—250.19 |

CHARLES A. WILLMUTH, *Primary Examiner.*